United States Patent
McIntyre et al.

(10) Patent No.: US 8,473,525 B2
(45) Date of Patent: Jun. 25, 2013

(54) METADATA GENERATION FOR IMAGE FILES

(75) Inventors: Dale F. McIntyre, Honeoye Falls, NY (US); John R. Fredlund, Rochester, NY (US)

(73) Assignee: Apple Inc., Cupertino, CA (US)

( * ) Notice: Subject to any disclaimer, the term of this patent is extended or adjusted under 35 U.S.C. 154(b) by 839 days.

(21) Appl. No.: 11/617,815

(22) Filed: Dec. 29, 2006

(65) Prior Publication Data

US 2008/0162450 A1    Jul. 3, 2008

(51) Int. Cl.
*G06F 17/30*    (2006.01)
(52) U.S. Cl.
USPC .......................................................... 707/803
(58) Field of Classification Search
None
See application file for complete search history.

(56) References Cited

U.S. PATENT DOCUMENTS

| | | |
|---|---|---|
| 6,351,556 B1 | 2/2002 | Loui et al. |
| 6,606,411 B1 | 8/2003 | Loui et al. |
| 6,993,180 B2 | 1/2006 | Sun et al. |
| 2003/0161499 A1* | 8/2003 | Svendsen et al. ............. 382/102 |
| 2004/0170318 A1 | 9/2004 | Crandall et al. |
| 2006/0018506 A1* | 1/2006 | Rodriguez et al. ............ 382/100 |
| 2006/0129547 A1* | 6/2006 | Yamamoto et al. ............... 707/5 |

* cited by examiner

*Primary Examiner* — Syed Hasan
(74) *Attorney, Agent, or Firm* — Wong, Cabello, Lutsch, Rutherford & Brucculeri LLP

(57) ABSTRACT

A system for associating content-relevant metadata with digital image files. The system searches memory for at least one image file deficient of content-relevant metadata and analyzes the at least one image file for determining existing content-relevant metadata. The at least one image file and at least a portion of candidate content-relevant metadata is presented to the to a user. The user is allowed to acknowledge the portion of the candidate content-relevant metadata presented, which can then be stored in a database.

5 Claims, 6 Drawing Sheets

METADATA GENERATION FOR IMAGE FILES

FIELD OF THE INVENTION

The present invention relates to metadata and more particularly to generating content-relevant metadata for the digital image files.

BACKGROUND OF THE INVENTION

With the advent of digital imaging and the popularity of the digital camera, the number of digital images stored on personal computers, on removable storage devices, and online at a service provider has increased exponentially. Digital image files originating from a digital still camera include the digital images and also typically include metadata generated from the digital camera. The metadata can be relevant information fundamental to the camera's function at the time of image capture, such as shutter speed, aperture, focal length, date, time etc. The relevant information can be stored as part of a digital image file or in an associated database of metadata. Such metadata can be useful in finding a specific image associated with the digital image file at some point in the future.

However, a consumer typically searches for a digital image file by looking for certain people, places or things that are present in an image associated with the digital image file. Metadata regarding the content of the image is a useful tool in the location of such files, but is rarely added by most consumers due to the tedious process of organization structures, like keywords found in a typical software application such as iPhoto™ from Apple Computer. Because consumers rarely take the time to add keywords relevant to the content of the image, digital image files deficient in content-relevant metadata are very common.

Following this trend and adding to the growing numbers of digital image files, hard copy silver halide prints are being scanned and creating even more digital image files that don't have camera-generated relevant metadata. Typically, computer operating systems will use the digital image file creation date when searching by date. However, with digital image files that originate from scanned hard copy prints, the file creation data is the date that the hard copy print was scanned and is not the desired date that the photograph was taken. Such digital image files are deficient in any relevant metadata. An additional burden to the growing collection of digital image files created by digital cameras is the cumulative organizational task of adding metadata to digital image files which becomes too time consuming for most consumers.

Another form of a digital image file adding to the growing number of digital image files is the video file. Significant numbers of digital still cameras today include the ability to capture video. Video files present an even more difficult opportunity with respect to relevant metadata.

As such, there is a need to automatically present images and content-relevant metadata to a user without the user's active intervention in a non-obtrusive manner. As various content-based image recognition algorithms continue to advance the art, there is a need to assist a consumer who might wish to supplement the camera-generated relevant metadata included with their digital image files. There is a further need to recognize the advance of technology with respect to image analysis and content-relevant metadata determination and assist the consumer in refining the established metadata associated with their digital image files.

SUMMARY OF THE INVENTION

In general terms, the present disclosure relates to a method and system that relates to digital image files and more particularly for generating metadata for the digital image files.

One aspect of the present invention is a method for associating metadata with image files. The method includes searching a memory for at least one image file deficient of content-relevant metadata, analyzing the at least one image file for determining existing content-relevant metadata, presenting the at least one image file and at least a portion of candidate content-relevant metadata to a user, allowing the user to acknowledge the at least a portion of the candidate content-relevant metadata presented, and storing the candidate content-relevant metadata.

Another aspect is a method for refining metadata associated with image files. The method includes identifying at least one image file and associated metadata, analyzing the metadata to determine a level of metadata refinement, providing a user with one or more additional levels of metadata refinement associated with the determined level of metadata refinement, allowing the user to select the one or more additional levels of metadata refinement, selecting specific metadata within the associated level, and storing the refined metadata.

Another aspect is a method for associating metadata with image files. The method includes searching memory for at least one image file deficient of content-relevant metadata, identifying at least one additional image related to the at least one image file deficient of content-relevant metadata, analyzing the at least one image and determining candidate content-relevant metadata, presenting the at least one image file and at least a portion of the candidate content-relevant metadata to a user, allowing the user to accept the accuracy of the at least a portion of the candidate content-relevant metadata presented, and storing the candidate content-relevant metadata.

Another aspect is system for associating metadata with image files. The system includes a processor for searching memory for at least one image file deficient of content-relevant metadata and analyzing the at least one image file for determining existing content-relevant metadata, a display for presenting the at least one image file and at least a portion of candidate content-relevant metadata to a user, a control device for allowing the user to acknowledge the at least a portion of the candidate content-relevant metadata presented, and a database for storing the candidate content-relevant metadata.

Yet another aspect is program storage device readable by a computer, tangible embodying a program or instructions executable by the machine to perform the method steps for associating metadata with image files. The method steps including searching a memory for at least one image file deficient of content-relevant metadata, analyzing the at least one image file for determining existing content-relevant metadata, presenting the at least one image file and at least a portion of candidate content-relevant metadata to a user, allowing the user to acknowledge the at least a portion of the candidate content-relevant metadata presented, and storing the candidate content-relevant metadata.

DETAILED DESCRIPTION OF THE INVENTION

Figure 1:
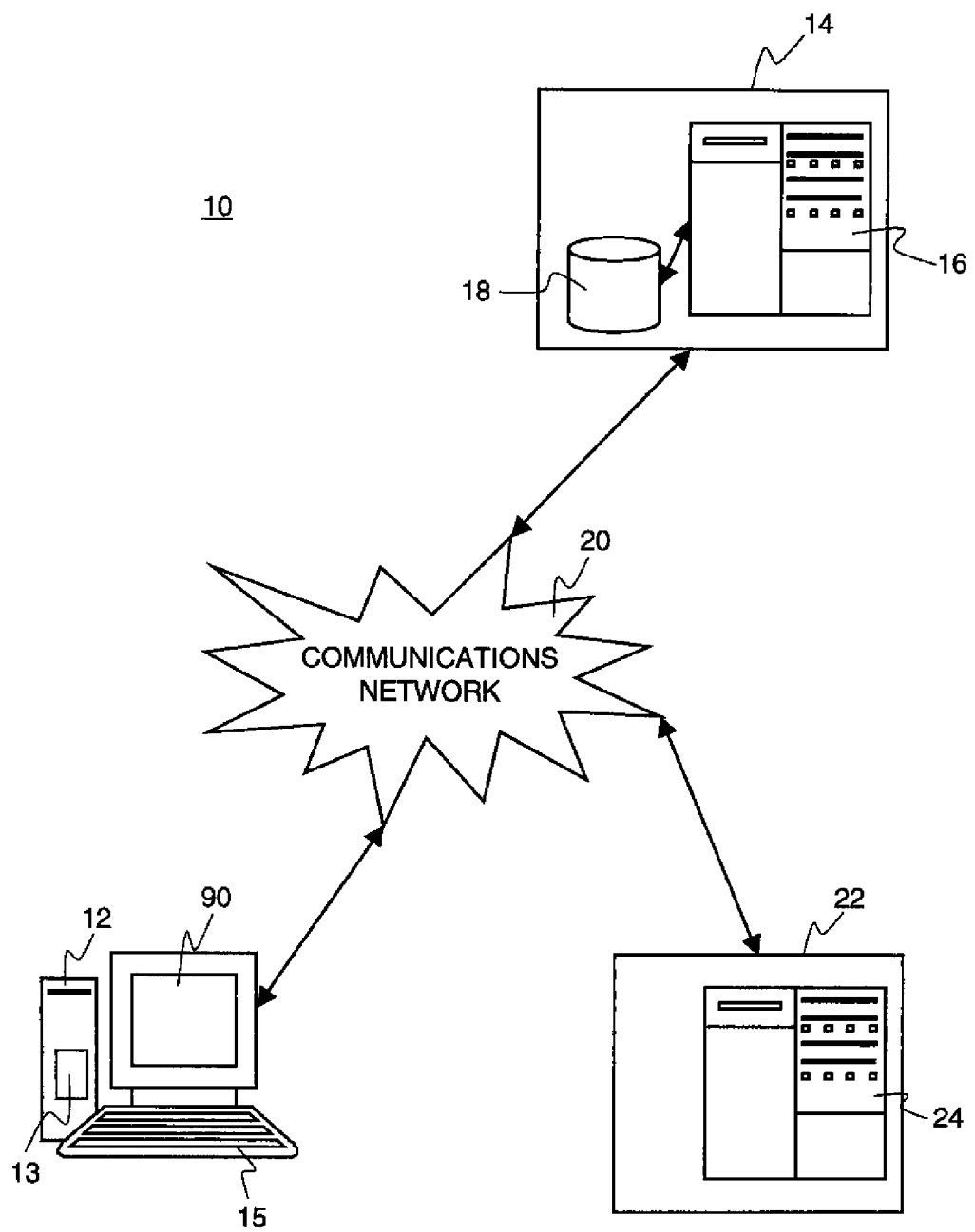
FIG. 1 illustrates a system for generating content-relevant metadata for image files.

Various embodiments will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Digital image file formats such as JPEG (Joint Photographic Expert Group) include the ability to store metadata within a digital image file using, for example, the EXIF standard. Other techniques for storing metadata include storing associated metadata in a database or storing metadata as a hidden file attached to the visible image file such as the Alternate Data Streams (ADS), which is a feature of the Windows NTFS files system. Storing metadata in a database allows the metadata to be stored remotely from the images.

FIG. 1 illustrates a system for generating content-relevant metadata for image files. In FIG. 1, a system 10 is shown having a personal computer 12 having an image memory 13, such as a database, for storing user's images and a display 90 for displaying the images. The system also includes a communications network 20, such as the Internet, and an online service provider 22 having at least one server 24 for storing image files of a user. The user's image files can be stored on the personal computer 12, the server 24 of the online service provider 22, or in both locations. The images can also be stored in memory distributed over a plurality of online service providers 22 including, but not limited to, other network locations such as peer-to-peer storage relationships, personal computers, and personal network storage devices. However, the invention is not limited to these storage locations, and any suitable storage location can be used, such as removable memory.

In addition to storing the images of the user, personal information is typically stored in the personal computer 12. The personal information can include, but is not limited to, home address, phone number, and many other types of information that can be used by system 10 to determine additional content-relevant metadata associated with images in the image memory. Such information can also be stored remotely at the online service provider 22 in association with a user account.

Also included in FIG. 1, is an online data provider 14 having a server 16 for communicating with data requesting devices such as the personal computer 12 and online service provider 22 over communication network 20. The online data provider 14 provides data from a database 18 to the requesting device. The requesting device can incur a fee charged by the online service provider 14 for conducting the transaction of providing the requested data. To receive data, the requesting device can provide an input, such as a zip code, and a category of desired information, such as "lake," and the online data provider 14 would provide a list of data matching the request such as all the lakes within the provided zip code. The list can be constrained by parameters such as distance or geological location. The parameters can be further constrained, for example, by data that does not incur a transaction fee. The online data provider 14 will help to provide the user with a list of candidate content-relevant metadata determined from the input parameters.

Figure 2:
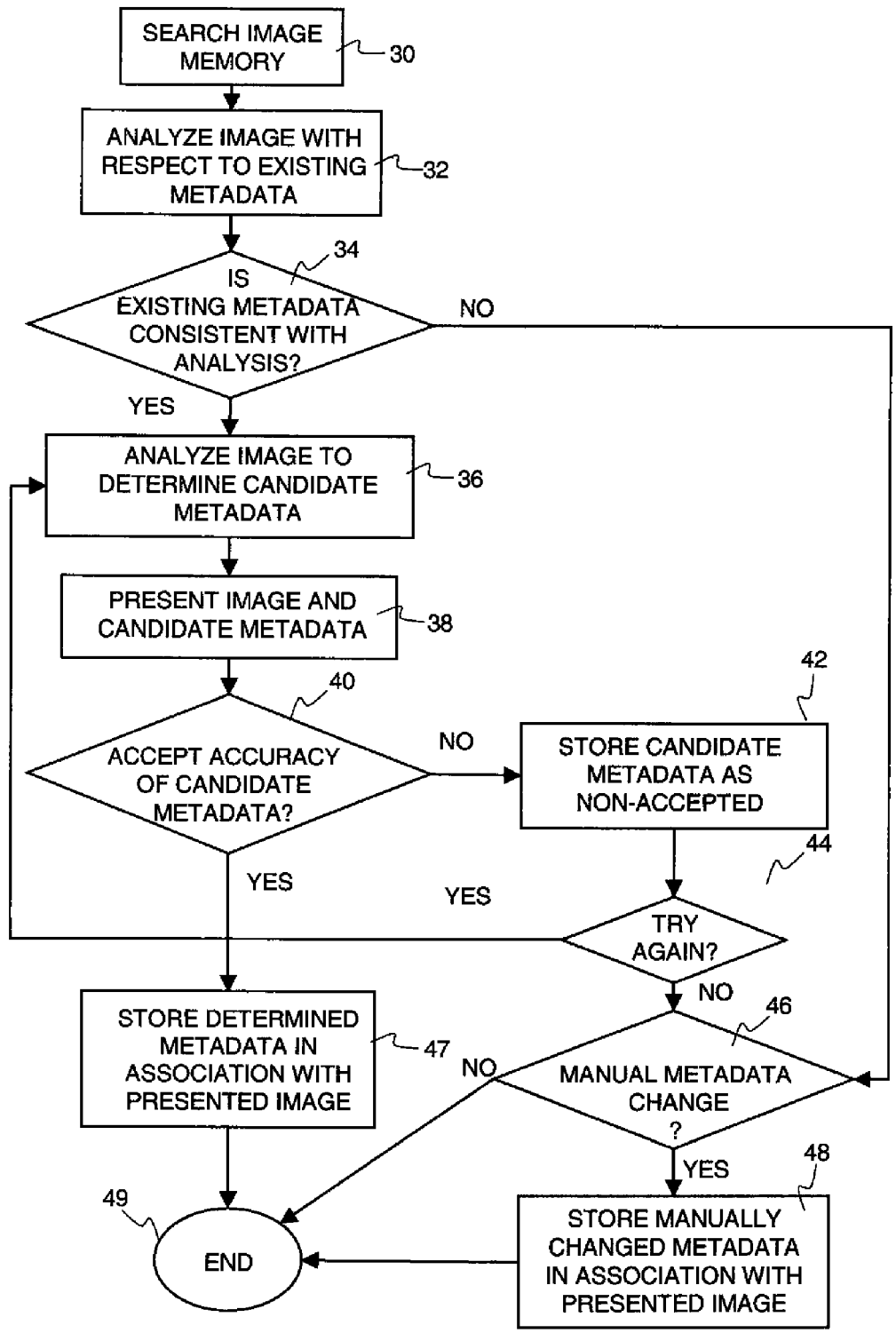
FIG. 2 is a flow chart illustrating one embodiment of generating content-relevant metadata for image files.

FIG. 2 is a flow chart illustrating one embodiment of generating content-relevant metadata for image files. To assist the user in adding or supplementing metadata stored in association with images, system 10 must be used to first search the image memory of the user 30. As discussed above, the image memory of the user can be widely distributed across many different devices attached to the communication network 20. The search is conducted without an active prompt from or other real-time interaction with the user. The search is performed in the background while the user is performing other tasks on the personal computer 12. The search can be executed by, but not limited to, a specific operating system event such as "startup". The search can also be executed periodically, such as once per day at 9:00 am, or to any systematic or random pattern that is non-distracting to the user.

The search is specifically looking for image files that are deficient in metadata. It will be understood that an image file deficient in metadata means that no content-relevant metadata is present at all, as in the case of a scanned hard copy print, or that there is no metadata that can be processed for the determination of additional content-relevant metadata, e.g., serial number of the camera. Additional determined content-relevant metadata is metadata that refines the existing metadata or it can replace the existing metadata. In either case, the additional determined content-relevant metadata provides more useful ways to locate an image stored in the image memory.

In addition, video key frames are digital still images derived from video sequences that can have metadata and can be searched upon according to the present embodiment. Aggregating metadata associated with video key frames can provide a more useful way to locate a video or video segments stored in the image memory. Video segments can also be substituted for video key frames when performing a search.

Determination of image files that are deficient in metadata may be relative. For example, a new user of the present embodiment can have many files that are either devoid of metadata or have little useful metadata. The threshold for presentation of images to the user will be low in this case, since there are many images with little useful metadata that are good candidates. In the case of a regular user of the present embodiment, all images can have associated useful metadata. In this case, the threshold for presentation will be higher, and images with less useful metadata than other images with more useful metadata will be candidates for presentation. In particular, if the version of software implementing the invention is updated, more possibilities for useful metadata can be created, so images previously analyzed and presented to the user can benefit from additional analysis and presentation.

Continuing with step 32, the image found to be deficient in metadata is analyzed to determine the consistency of the existing metadata provided with the image at the point of origination. Such metadata is provided by the digital camera or scanner. For example, an image can have a time stamp of 11:00 PM in New York, N.Y., yet the analysis of the image shows a histogram indicative of a sunny day. The automatic determination of this inconsistency 34 is brought to the attention of the user 46 where the user is allowed to manually change the inconsistent metadata to produce content-relevant metadata. This example is the likely outcome of the metadata associated with a newly scanned hard copy image. The file creation date is not representative of the time/date of capture of the photograph.

When the results of the image analysis are consistent with the existing metadata, the image is then analyzed to determine candidate content-relevant metadata 36. In one embodiment, with a very simple and high-level analysis, the analysis can result in, for example, the detection of a lake as candidate content-relevant metadata. The image and the candidate content-relevant metadata "lake" are presented to the user 38 for acknowledgement that includes acceptance or rejection 40 of the accuracy of the candidate content-relevant metadata. The user uses a control device 15, such as a computer keyboard, for accepting or not accepting the candidate content-relevant metadata. However the embodiment is not limited to a computer keyboard and any suitable control device can be used, such as verbal commands and/or touch screen. If the invention is implemented in an entertainment system, the suitable control device can be a remote controller such as those commonly used to control and select television programming. Upon acceptance, the candidate content-relevant metadata is now stored with the presented image 47 as content-relevant metadata. Alternatively, the candidate content-relevant metadata can be stored apart from the presented image and reference the presented image by filename or location. The content-relevant metadata can be stored locally or at some remote location connected by a network. This level of content-relevant metadata determination, while useful, is capable being refined with the assistance of the online data provider 14, which is discussed in more detail with respect to FIG. 3.

Note that the analysis of the consistency of the existing metadata and also the analysis of content-relevant metadata may be performed by computers or by humans. In the case of analysis performed by computers, this analysis can occur locally on the user's device or at remote location such as an image server connected by a network. In the case of analysis performed by humans, images or low-resolution representations of the images, or keyframes or segments in the case of video, may be transmitted to a site where people are employed to analyze the imagery and provide metadata.

The acceptance of the candidate content-relevant metadata as content-relevant metadata at any level of refinement provides a further opportunity for adding the content-relevant metadata associated with the presented image to other related images. In U.S. Pat. No. 6,606,411 ('411) issued to Loui et. al., a technique for automatically classifying images into events is disclosed and is incorporated herein by reference. The system of the '411 patent uses a temporal approach to classifying images into events or groups of related images. In U.S. Pat. No. 6,993,180 B2 ('180) issued to Sun et. al., a technique for automatically grouping images based on color is disclosed and is incorporated herein by reference. The system of the '180 patent uses a color based approach to grouping related images. In U.S. Pat. No. 6,351,556 ('556) issued to Loui et. al., a method for automatically comparing the content of images for classification into events is disclosed and is incorporated herein by reference. The method of the '556 patent uses content-based image analysis to determine images that are related to each other or that belong to an event. The resulting image event classification from these incorporated references provides a relationship between the image presented to the user (step 38) and other images deficient in content-relevant metadata. In this alternate embodiment, the acceptance (step 40) of the candidate content-relevant metadata allows system 10 to automatically add the accepted candidate content-relevant metadata to these related images provided by the classification of the incorporated references. In this manner, the user can quickly and systematically improve the organization of their image collection without having to actively run an application program specifically for the task of organizing his images or without having to allocate an excessive amount of time to the organizing process. Note that it can be useful to specify the difference between user-accepted content-relevant metadata and that inferred by the system, which is not user-accepted. This can be useful in correcting errors when the system infers content-relevant metadata that is not appropriate due to misclassification by the incorporated references.

When the user does not accept the accuracy of the candidate content-relevant metadata 40, this candidate content-relevant metadata is marked and stored as "not accepted" 42. Knowing that a particular candidate content-relevant metadata is "incorrect" is equally valuable information, which helps narrow down the list of candidate content-relevant metadata. If the user is interested in trying another candidate content-relevant metadata 44, the analysis (step 36) is repeated to find an accepted metadata. If the user is not interested in trying another candidate content-relevant metadata 44, the user is given the option of providing the correct content-relevant metadata manually 46, which is stored in association with the presented image 48. Another option is to provide the user with a "don't care" selection option. This is appropriate for images that are not of great value to the user. While the user may not wish to delete these images, he may also not wish to expend the effort to regard the metadata associated with them. In this manner, the system can provide additional value to the user by adding "don't care" metadata to a group of images identified by the abovementioned incorporated references. The process ends 49, but will begin again for whenever content-relevant metadata is needed for an image. Because the stored content-relevant metadata was provided by the user and also stored, this content-relevant metadata provides an anchor point for future metadata refinement.

Figure 3:
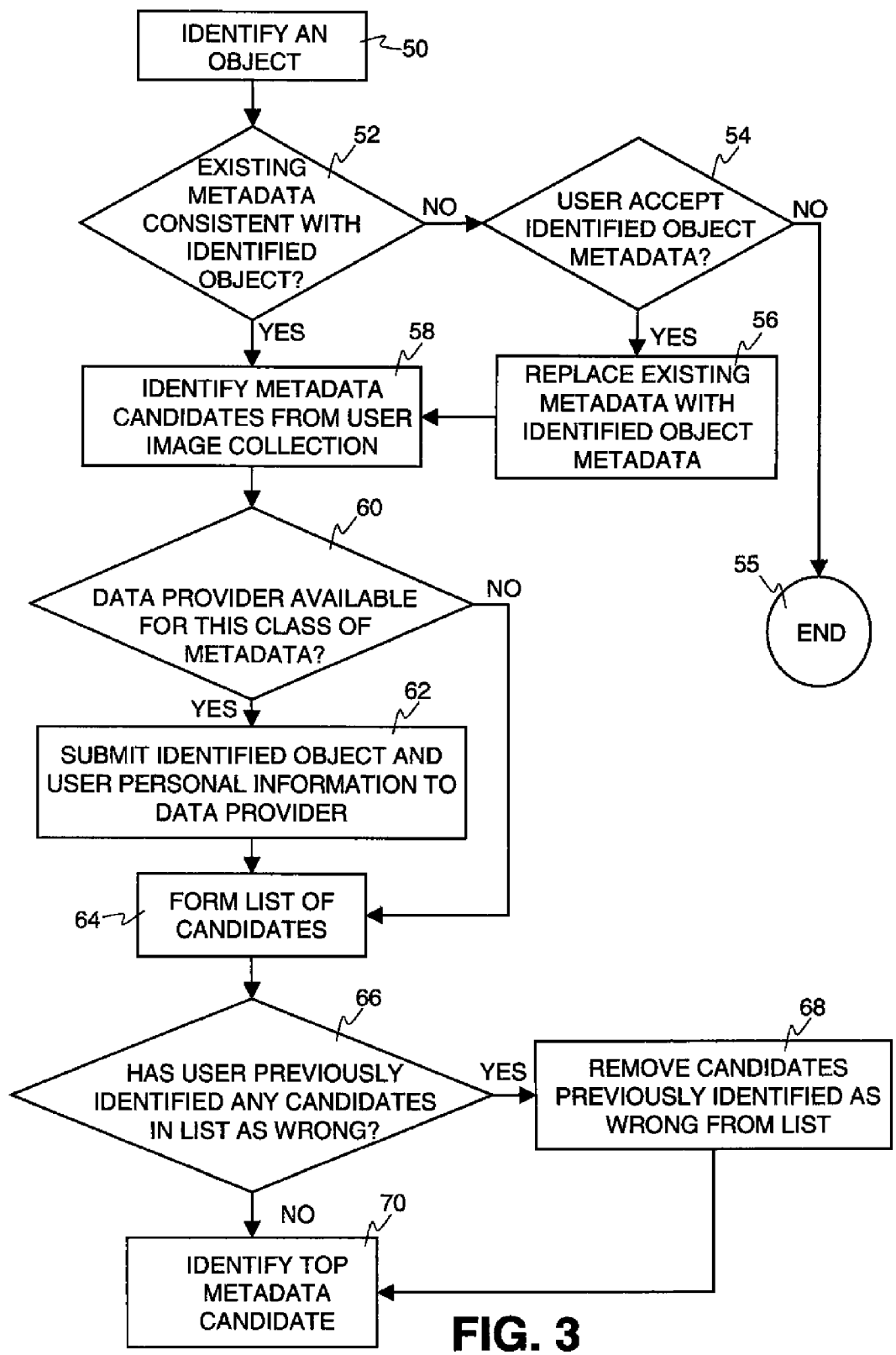
FIG. 3 is a flow chart illustrating one embodiment of analyzing images to determine content-relevant metadata with respect to FIG. 2.

FIG. 3 is a flow chart illustrating one embodiment of analyzing images to determine content-relevant metadata with respect to step 36 of FIG. 2. Content-relevant metadata refinement is made possible by a variety of techniques as discussed with respect to FIG. 3. An object in the image, by way of example, but not limitation such as a person, tree, lake, fish etc., has been identified 50 using content-based image recognition algorithms commonly understood in the art. An example of a content-based image recognition algorithm is illustrated in U.S. Publication No. 2004/0170318. A consistency check 52 is performed to verify that the identified object is consistent with any existing metadata. If the object isn't consistent with any existing metadata, the user has the option 54 to reject or accept and store 56 the new object metadata. If the user rejects the metadata, the refinement process ends 55.

More likely, technological advances in content-based image recognition have properly identified the object and the metadata refinement process continues with the identification 58 of candidate content-relevant metadata by drawing from similar metadata refinements. In other words, if a lake is the identified object, the user's image collection located in memory is searched for other instances of "lake" where a metadata refinement has been made. Searching existing metadata is but one way to determine candidate content-relevant metadata. Image files can have filenames that provide possible content-relevant metadata candidates. In some cases, the user can have entered comments in a text field, using software such as iPhoto™ offered by Apple Computer. Common search techniques, e.g., to look for words within one word of finding an occurrence of the word "lake," can be applied to this search for candidate content-relevant metadata. Images can be stored in a hierarchical folder system where the containing folder contains the name of the lake. These possible refinement candidates form the basis of a list of candidate content-relevant metadata for presentation to the user (step 38, FIG. 2).

Once candidate content-relevant metadata has been identified from the user's image collection, it is useful to determine if there is an online data provider 14 for the class of metadata associated with the identified object 60. If not, the list of candidate content-relevant metadata is limited to the candidates extracted from the search of the user's image collection. Continuing with the example of the identified lake, submitting the identified object "lake" and information, such as zip code, enables online data provider 14 to provide a list of candidate content-relevant metadata 62. The dedicated online data providers 14 can elect to charge a fee for their service. Alternatively, general data search engines such as Google™ and Yahoo™ provide text data upon query that requires more searching to retrieve candidate content-relevant metadata and don't charge for their search service. Search data used to refine the identified object can be found in the personal information of the user as previously discussed.

The list of candidate content-relevant metadata is formed from the candidate metadata extracted from the user's image collection 64 and the candidate metadata provided from the online data provider 14. The metadata of the identified image is also checked to see if any candidate content-relevant metadata have been rejected by a previous confirmation step with the user 66. If so, the candidates previously identified are removed from the list 68. The process results in identifying the top content-relevant metadata candidates 70.

Figure 4:
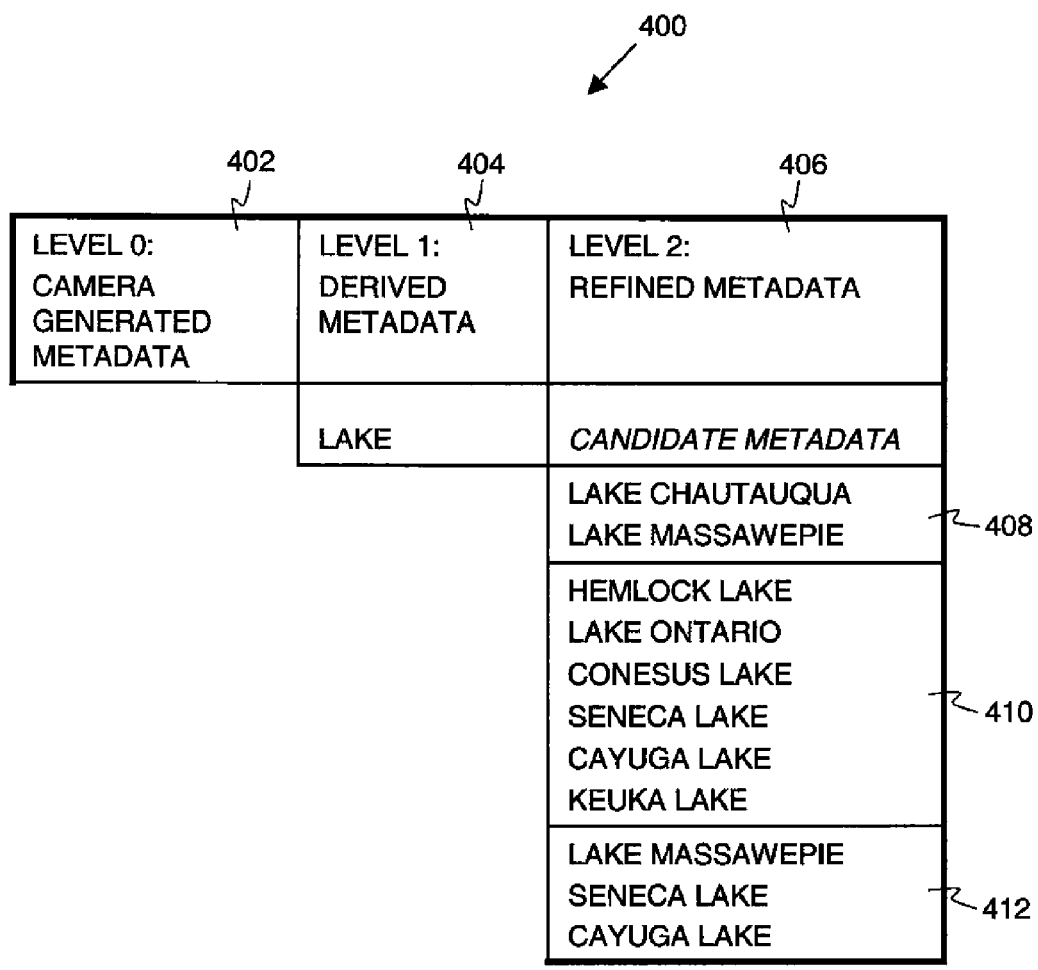
FIG. 4 shows a table illustrating three levels of generated metadata.

FIG. 4 shows a table 400 illustrating three levels of generated metadata. In FIG. 4, Level 0 metadata 402 is the metadata provided by the image capture device such as a digital still camera (see FIG. 5A block 94) or a scanner. Level 1 metadata 404 is the candidate content-relevant metadata derived from the image using typical content-based image recognition algorithms. Finally, Level 2 metadata 406 is the refined candidate content-relevant metadata. FIG. 4 shows the Level 2 refined metadata formed into a list containing existing candidate content-relevant metadata 408 from the user's image collection (e.g., Lake Chautauqua and Lake Massawepie), provided candidate content-relevant metadata 410 from the online data provider 14, and the candidate content-relevant metadata 412 that had been previously rejected with respect to the identified image. In this example, the candidate content-relevant metadata presented to the user (step 38, FIG. 2) would be "Hemlock Lake" followed iteratively by "Lake Ontario", "Conesus Lake", and "Keuka Lake". The list can be presented one candidate at a time or the entire list can be presented for allowing the user to select the proper candidate content-relevant metadata.

There can be a hierarchy of candidate content-relevant metadata presented to the user based on the analysis that produces the metadata. For example, if the analysis identifies an object as "lake," but does not detect an opposite shoreline, the candidate lakes such as lakes Chautauqua, Massawepie, Hemlock, Conesus, and Keuka would fall in priority for presentation since they are relatively small in size. However, candidate content-relevant metadata for lakes such as Ontario and Erie, which are much larger, and do not provide a view of the opposite shoreline, would rise in the priority for presentation. Additionally, candidate content-relevant metadata for oceans such as Atlantic and Pacific can be presented before the smaller lakes.

Figure 5A:
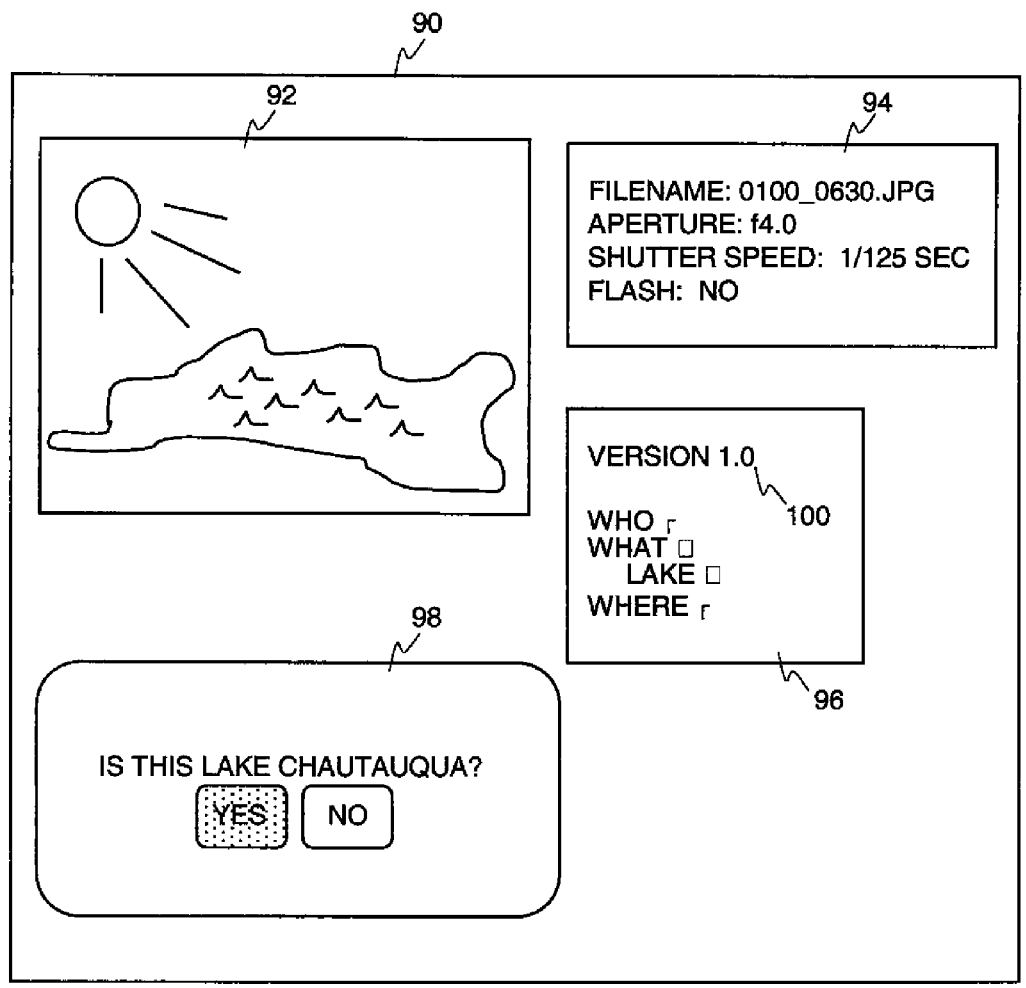
FIG. 5A illustrates one embodiment of candidate content-relevant metadata displayed on a screen of a personal computer.

FIG. 5A illustrates one embodiment of candidate content-relevant metadata displayed on a screen of a personal computer 12. In FIG. 5, an image 92 is shown as presented to the user on display screen 90 and the content analysis (step 36, FIG. 2) has identified a "lake" in the picture. Level 0 metadata block 94 includes several typical metadata included with an image captured by a digital camera. Level 1 metadata block 96 includes derived and identified metadata such as "Lake." Level 1 metadata block 96 also includes the version number of the candidate analysis software, indicating version 1.0 (100). In this example, the candidate content-relevant metadata presented to the user in dialog box 98 ("Chautauqua Lake") was extracted from previously refined "Lake" in the user's image collection as discussed earlier. Version 1.0 software, in this example, does not have the capability to provide further refinement candidates.

Figure 5B:
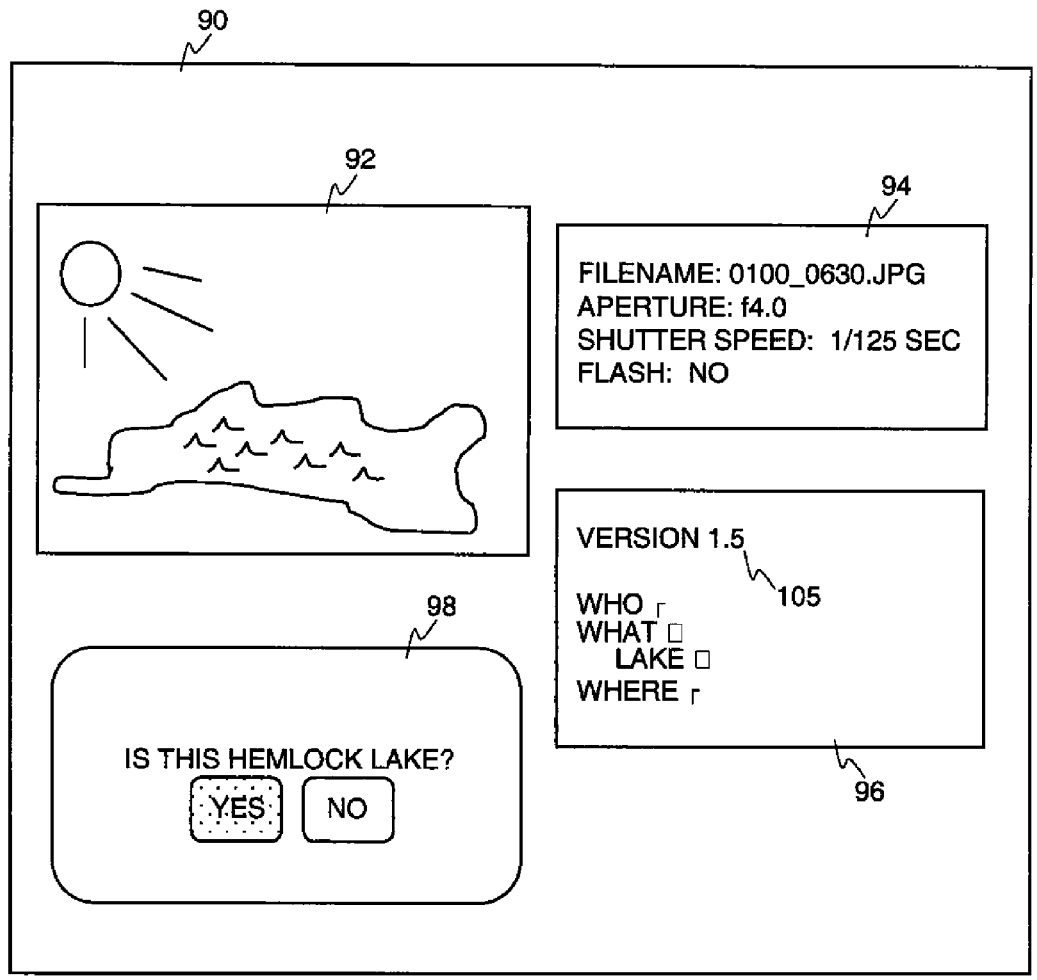
FIG. 5B illustrates one embodiment of refined candidate content-relevant metadata displayed on a screen of a personal computer using an advanced software version.

FIG. 5B illustrates one embodiment of refined candidate content-relevant metadata displayed on a screen of a personal computer 12 using an advanced software version 1.5 (105). With the version in this example, further refinement candidates have been made possible by providing the term "lake" and, but not limited to, the user's zip code to online data provider 14. On any computer-based system, information (e.g., zip code) is stored in a memory 13 as part of typical user preferences and can be supplied to the online data provider 14. These refined content-relevant candidates are also depicted in the table of FIG. 4. Dialog box 98, in this example, has offered the user the refinement candidate, "Hemlock Lake". Version 1.5 software has determined that the user had rejected the previously presented candidate "Chautauqua Lake" and proceeded to present the next refined candidate content-relevant metadata in the list. Obviously, accessing and cross referencing multiple online data providers 14 would enable a more robust list of refined candidate content-relevant metadata to be presented to the user. Furthermore, each online data provider 14 can be provided a different input. For example, "lake" along with the user's zip code can be provided to one online data provider 14 while another online data provider 14 is provided with "lake" along with city, "Honeoye Falls".

The various embodiments described above are provided by way of illustration only and should not be construed to limit the invention. Those skilled in the art will readily recognize various modifications and changes that can be made to the present invention without following the example embodiments and applications illustrated and described herein, and without departing from the true spirit and scope of the present invention, which is set forth in the following claims.

PARTS LIST 10 system
12 personal computer
13 memory
14 data provider
15 control device
16 server
18 database
20 communication network
22 service provider
24 server
30 step
32 step
34 step 36 step
38 step
40 step
42 step
44 step
46 step
47 step
48 step
49 step
50 step
52 step
54 step
55 step
56 step
58 step
60 step
62 step
64 step
66 step
68 step
70 step
90 display
92 image
94 Level 0 metadata block
96 Level 1 metadata block
98 dialog box
100 version 1.0
105 version 1.5
400 Table
402 Level 0 metadata
404 Level 1 metadata
406 Level 2 metadata
408 candidate content-relevant metadata
410 content-relevant metadata
412 candidate content-relevant metadata

What is claimed is:

1. An image processor-implemented method for associating metadata with image files, comprising:
   automatically identifying a single image file with existing metadata;
   automatically analyzing the image content of the single image file to determine candidate content-relevant metadata;
   automatically comparing the candidate content-relevant metadata to the existing metadata of the single image file to determine inconsistency;
   automatically using the determined inconsistencies to identify that the candidate content-relevant metadata is completely consistent with the existing metadata or inconsistent with the existing metadata or includes data that is both consistent and inconsistent with the existing metadata;
   when the candidate content-relevant metadata is completely consistent, then storing such candidate content-relevant metadata that is consistent with existing metadata in association with the single image file;
   when the candidate content-relevant metadata includes an inconsistency, then presenting the single image file and at least a portion of the inconsistent candidate content-relevant metadata to a user;
   permitting the user to accept the determined at least a portion of the inconsistent candidate content-relevant metadata or the existing metadata; and
   storing the user accepted metadata in association with the image file.

2. The image processor-implemented method of claim 1, wherein detecting image content further comprises performing facial recognition.

3. The image processor-implemented method of claim 1, wherein storing the candidate content-relevant metadata further comprises storing changed metadata with an associated image.

4. The image processor-implemented method of claim 1, wherein storing the candidate content-relevant metadata data further comprises automatically storing changed metadata with respect to a plurality of related images.

5. The image processor-implemented method of claim 1, including storing information indicating whether or not the user accepted the candidate content-relevant metadata.

* * * * *